United States Patent [19]
Funabashi

[11] Patent Number: 6,076,858
[45] Date of Patent: *Jun. 20, 2000

[54] FUEL TANK MOUNTING STRUCTURE

[75] Inventor: Mamoru Funabashi, Tochigi-ken, Japan

[73] Assignee: Honda Giken Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/086,946

[22] Filed: May 29, 1998

[30] Foreign Application Priority Data

Jun. 11, 1997 [JP] Japan ................................. 9-153960

[51] Int. Cl.[7] ...................................................... B60P 3/22
[52] U.S. Cl. ......................... 280/834; 220/4.14; 220/4.24
[58] Field of Search ................................. 280/830, 834; 220/4.12, 4.14, 4.21, 4.24

[56] References Cited

U.S. PATENT DOCUMENTS

| | | | |
|---|---|---|---|
| 1,837,845 | 12/1931 | Zerbi | 220/4.14 |
| 2,806,622 | 9/1957 | Leirer | 220/4.14 |
| 4,093,254 | 6/1978 | Ezaki | 280/834 X |
| 4,357,027 | 11/1982 | Zeitlow | 280/834 |
| 4,453,724 | 6/1984 | Watanabe et al. | 280/834 |
| 5,191,988 | 3/1993 | Reil et al. | 220/4.24 |

*Primary Examiner*—Michael Mar
*Attorney, Agent, or Firm*—Armstrong, Westerman, Hattori, McLeland & Naughton

[57] ABSTRACT

In an electric vehicle in which a battery container box is disposed under the floor of the vehicle, a fuel tank for a combustion type of heater is easily mounted with a good space efficiency. For that purpose, the fuel tank is formed into a shape of a substantially square column which is elongated in the widthwise direction of the vehicle and which is made of two halves divided along a diagonal plane to connect a bottom line of one of the horizontally opposing planes and an upper line of the other of the horizontally opposing planes. Brackets are attached to side surfaces of the fuel tank, and the fuel tank is mounted under the floor of the vehicle via the brackets behind the battery container box so as to be close thereto.

18 Claims, 4 Drawing Sheets

FUEL TANK MOUNTING STRUCTURE

BACKGROUND OF THE INVENTION

1. Field of the Invention

The present invention relates to a fuel tank mounting structure for mounting a fuel tank on a vehicle such as an electric vehicle.

2. Description of the Related Art

Recently, an electric vehicle is receiving attention from the viewpoint of preventing the air pollution.

One of the problems with the electric vehicle is how to secure a space for storing batteries without sacrificing the compartment space. As a solution, there is known an electric vehicle in which a battery container box is disposed under the floor of a vehicle body.

The electric vehicle sometimes has mounted thereon a combustion type of heater for the purpose of heating the compartment. In this case, it is desired to mount a fuel tank for the heater with a better space efficiency.

In an electric vehicle in which the battery container case is disposed under the floor of the vehicle body, it is advantageous from the viewpoint of space efficiency to dispose the fuel tank on a rear side of the battery container box as close thereto as possible. If the fuel tank is arranged, like a conventional arrangement, to one which is made by coupling two halves which are horizontally divided into an upper half and a lower half by means of flanges on the horizontal planes, there is the following disadvantage. Namely, in order to prevent the front flange which horizontally extends forward from the front end of the fuel tank from coming into abutment with the rear end of the battery container box, there must be secured, between the battery container box and the fuel tank, a space whose dimension is the sum of the flange width and some allowance. This is a hindrance to improving the space efficiency.

In view of the above-described problem, the present invention has an object of providing a fuel tank mounting structure in which a fuel tank can be mounted with a good space efficiency and in which the fuel tank can be mounted easily.

SUMMARY OF THE INVENTION

In order to attain the above and other objects, the present invention is a fuel tank mounting structure for mounting a fuel tank under a floor of a vehicle, characterized in: that the fuel tank is formed into a shape of a substantially square column having a pair of horizontally opposing planes, the fuel tank being made of two halves divided along a diagonal plane to connect a bottom line of one of the horizontally opposing planes and an upper line of the other of the horizontally opposing planes, the two halves being coupled by flanges provided around the diagonal plane; that a bracket is bolted to that end portion of the flanges which lies on each longitudinal end of the fuel tank; and that the fuel tank is mounted under the floor via the brackets.

In case the fuel tank mounting structure is for mounting a fuel tank for a combustion type of heater, the fuel tank being mounted on an electric vehicle which comprises a battery container box disposed under a floor of a vehicle body, the fuel tank is formed into a shape of a substantially square column elongated in a widthwise direction of the electric vehicle, and the fuel tank is made of two halves divided along a diagonal plane to connect a front bottom line and a rear upper line. The two halves are coupled by flanges provided around the diagonal plane. A bracket is bolted to that end portion of the flanges which lies on each longitudinal end of the fuel tank. The fuel tank is mounted under the floor via the brackets in a rear position close to the battery container box.

According to the above-described arrangements, the flanges on the front end of the fuel tank protrude slantingly downward from the front bottom line of the fuel tank. The width of forward projection of the flanges on the front end becomes smaller than the width of the flanges. The fuel tank can therefore be disposed closer to the battery container box by the amount equivalent to the above-described smaller width. In particular, if an arrangement is made that a front bottom line of the fuel tank is chamfered such that the front end of the flanges which protrude beyond the front bottom line substantially coincides with, or lies behind, a vertical line which passes through a front endmost portion of the fuel tank, the flanges on the front end will not be a hindrance to the battery container box. As a result, the fuel tank can be disposed as close to the battery container box as possible. The space efficiency can thus be improved.

Further, the fuel tank can be mounted on the vehicle body only by fixing with bolts, or the like, the brackets that have been bolted to the flanges on the end surfaces of the fuel tank. The mounting of the fuel tank can thus become easy.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
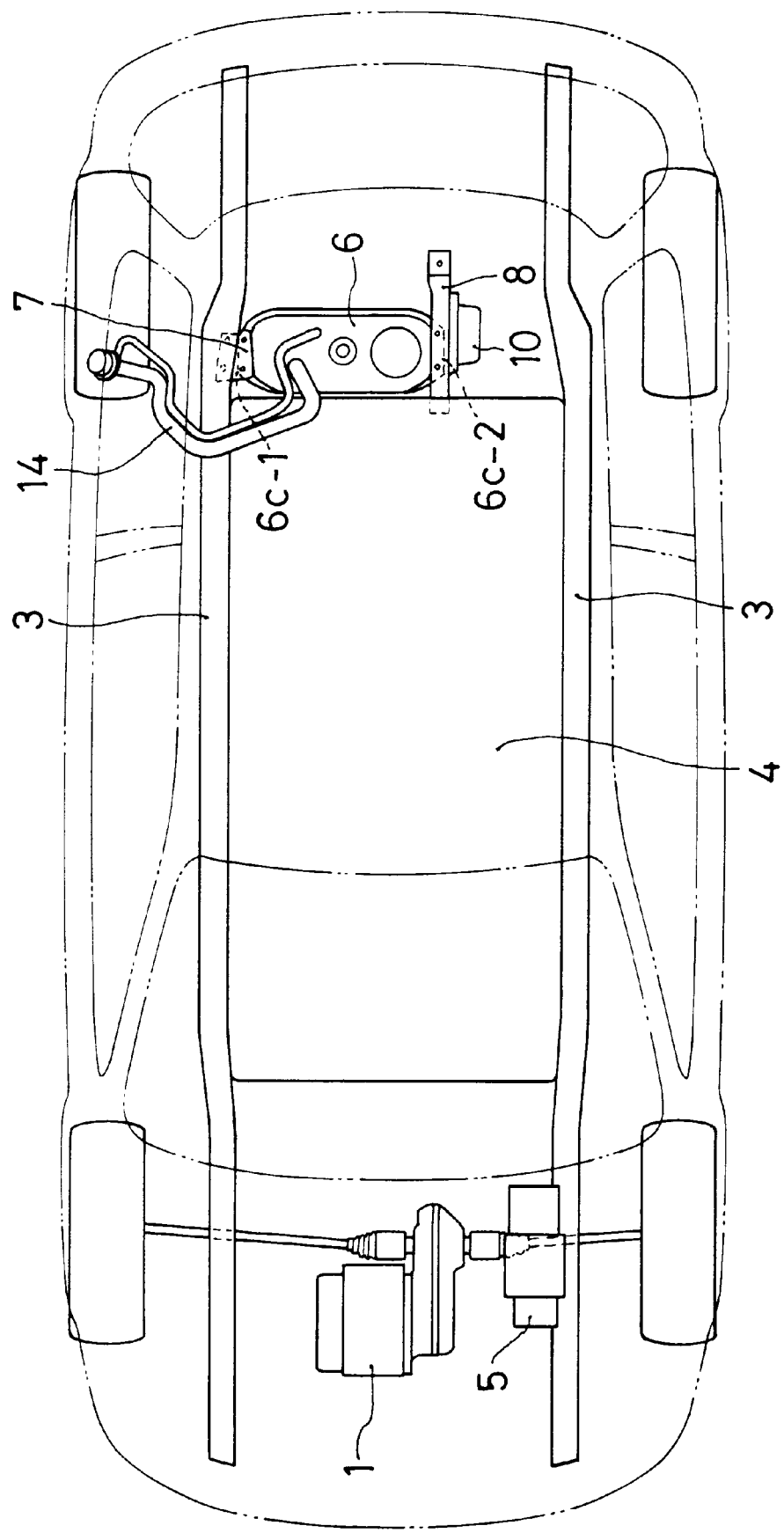
FIG. 1 is a plan view to show a layout of a heater and a fuel tank of an electric motor vehicle.
Figure 2:
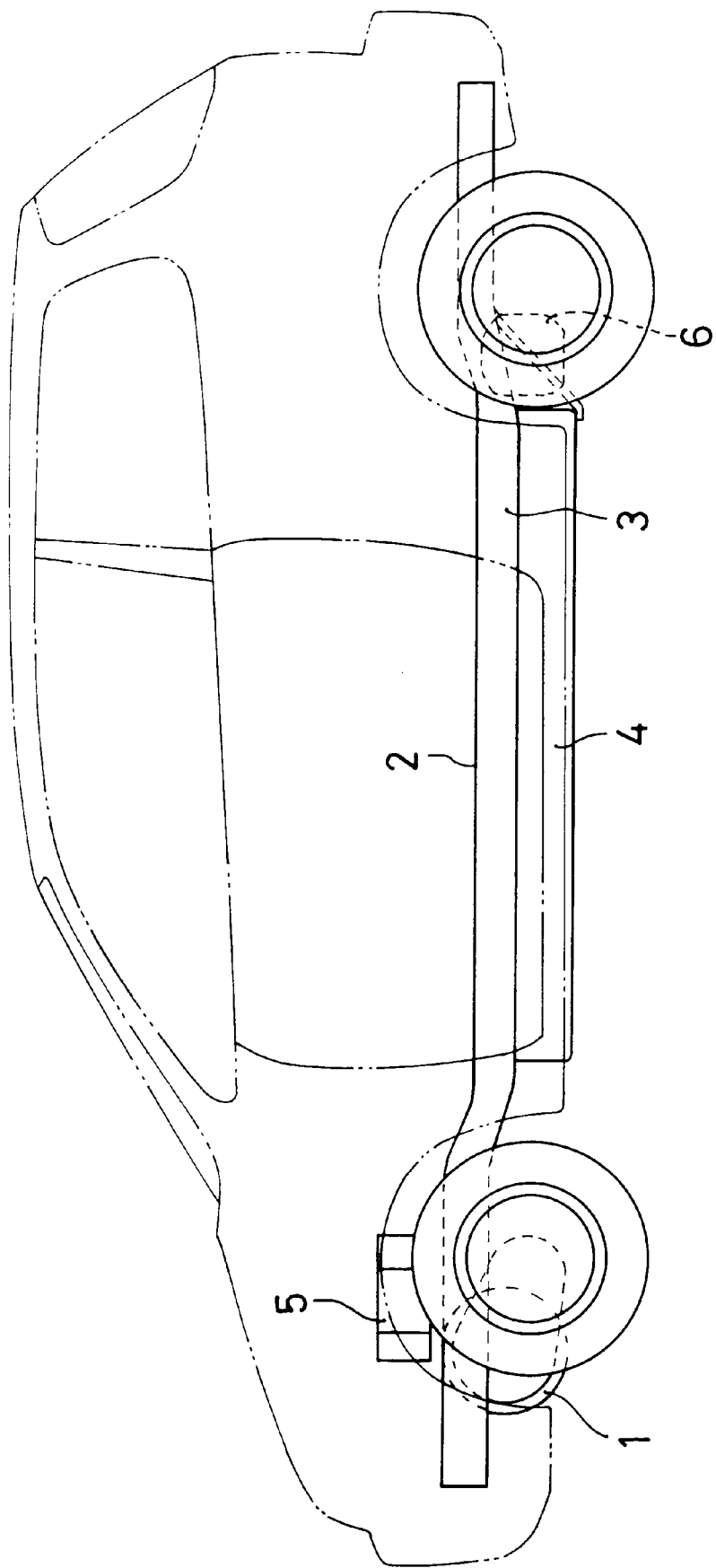
FIG. 2 is a side view thereof.

FIGS. 1 and 2 show an electric vehicle. In this electric vehicle an electric motor 1 for driving the front wheels is disposed in a front portion of a vehicle body. Under a floor 2 of the electric vehicle, there is disposed a battery container box 4 in a manner to lie across right and left floor side frames 3, 3. Electric power is supplied to the electric motor 1 from batteries contained in the battery container box 4.

In a front portion of the vehicle body, there is disposed a combustion type of heater 5 for the purpose of heating the compartment of the vehicle. In a rear position which is adjacent to the battery container box 4 under the floor 2, there is disposed a fuel tank 6 in a manner deviated to one side as seen in the widthwise direction of the vehicle. The fuel from the fuel tank 6 is supplied to the combustion type of heater 5.

Figure 3:
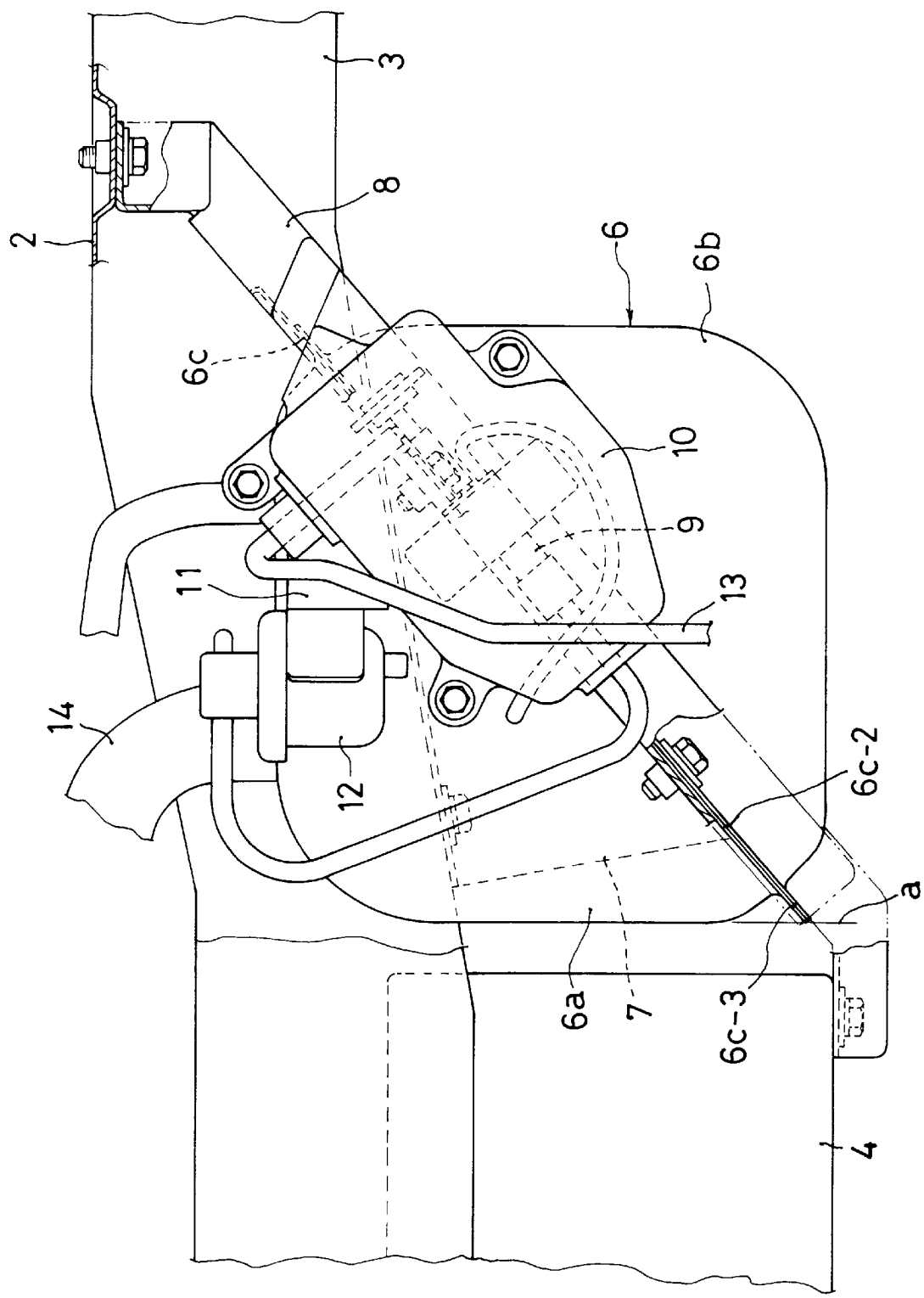
FIG. 3 is an enlarged side view of the fuel tank.
Figure 4:
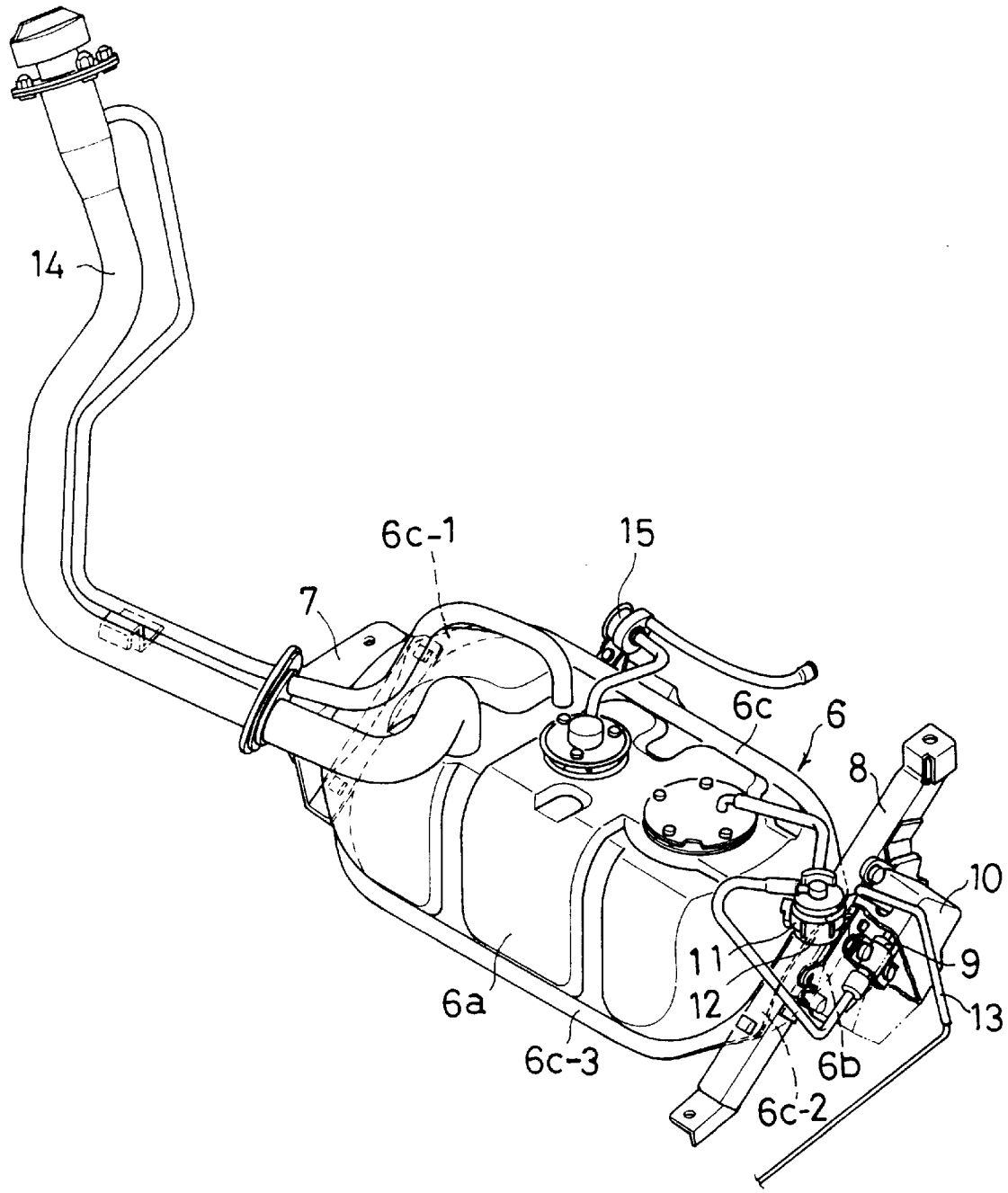
FIG. 4 is a perspective view of the fuel tank.

As shown in FIGS. 3 and 4, the fuel tank 6 has the following construction. Namely, two halves 6a, 6b which are divided along a diagonal plane to connect a front bottom line (or edge) and a rear upper line (or edge), are coupled together along flanges 6c which are provided around the diagonal plane. The fuel tank is thus formed into the shape of a substantially square column which is elongated in the widthwise direction of the vehicle.

On an upper surface of that portion of the flange 6c (i.e., an end flange 6c-1) which lies on one longitudinal end of the fuel tank 6, there is bolted a plate-like bracket 7 which rises (or extends upward) from the flange 6c-1. On an upper surface of that portion of the flange 6c (i.e., an end flange 6c-2) which lies on the other longitudinal end of the fuel tank 6, there is bolted a bar-like bracket 8 which projects or extends in the forward and downward direction as well as in the backward and upward direction. The bracket 7 is bolted from the lower side to the floor side frame 3 which lies on one side of the vehicle body. The front end portion of the bracket 8 is bolted to the rear bottom surface of the battery container box 4, and the rear end portion of the bracket 8 is bolted to the bottom surface of the floor 2, respectively. The fuel tank 6 is thus mounted under the floor 2.

In this arrangement, the front bottom line (or edge) of the fuel tank 6 is chamfered. The front end of the front flange 6c-3 which projects outward from the front bottom line (or edge) is arranged not to project beyond a vertical plane "a" which passes along the front endmost plane of the fuel tank 6. Therefore, the front flange 6c-3 will not be a hindrance to the battery container box 4. As a result, the fuel tank 6 can be disposed on the rear side of the battery container box 4 as close thereto as possible while securing a small clearance between the front end of the fuel tank 6 and the rear end of the battery container box 4 in order to prevent interference therebetween. The space efficiency can thus be improved.

On an outside surface of the bracket 8, there is mounted a container case 10 for containing therein a fuel pump 9. Further, a strainer 12 is mounted on the container case 10 via a stay 11. The fuel is thus sucked by the fuel pump 9 from the fuel tank 6 via the strainer 12, and the sucked fuel is then supplied to the combustion type of heater 5 via a supply pipe 13.

In the figure, reference numeral 14 denotes a fuel feed pipe to feed the fuel into the fuel tank 6, and reference numeral 15 denotes a two-way valve which prevents the internal pressure in the fuel tank 6 from becoming a positive pressure above a predetermined value as well as a negative pressure below a predetermined value.

An explanation has so far been made about the fuel tank mounting structure for mounting a fuel tank on a vehicle such as an electric vehicle. The present invention can however be similarly applicable to the mounting structure for mounting a fuel tank on a vehicle other than an electric vehicle. In other words, in case there is a downwardly projected portion under the floor of the vehicle, and a fuel tank is mounted in a position close to this projected portion, the fuel tank may be constituted as follows. Namely, the fuel tank is formed into the shape of a substantially square column which is made of two halves divided along a diagonal plane to connect a bottom line and an upper line. The two halves are then connected together by flanges provided around the diagonal plane. The fuel tank can thus be mounted with a good space efficiency by disposing the fuel tank close to the projected portion. A bracket is bolted to that end portion of the flanges which lie on each longitudinal end of the fuel tank. The fuel tank is then mounted under the floor via the brackets. The work of mounting the fuel tank thus becomes easy.

It is readily apparent that the above-described mounting structure for mounting a fuel tank meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A fuel tank mounting structure for mounting a substantially square column fuel tank under a floor of a vehicle, the fuel tank having a longitudinal front surface facing a front of the vehicle and extending transversely to a longitudinal direction of travel of the vehicle, a longitudinal rear surface facing a rear of the vehicle, a first width end and a second width end facing opposite sides of the vehicle; and two halves, divided along a diagonal plane, with each half having a flange circumscribing an edge which abuts the other half, the first and second width ends having abutting inclined flange portions; the fuel tank mounting structure comprising:

an inclined plate bracket having a first plate surface bolted to the inclined flange portions of the abutting halves of the first width end of the fuel tank and a second plate surface mounted onto a surface, receptive to the second plate surface, under the floor of the vehicle; and an inclined bar bracket in abutting engagement with and bolted, along a length of the bar bracket, to the inclined flange portions of the abutting halves of the second width end of the fuel tank and mounted via opposite ends of the bar bracket onto frame members located under the floor of the vehicle.

2. The fuel tank mounting structure of claim 1, wherein the flange on the front of the fuel tank extends a distance short of a vertical plane defined by the longitudinal front surface of the fuel tank.

3. The fuel tank mounting structure of claim 2, wherein the flange is chamfered.

4. The fuel tank mounting structure of claim 1, wherein the inclined bar bracket extends in a diagonal direction parallel to the diagonal halves of the fuel tank.

5. The fuel tank mounting structure of claim 1, wherein the inclined bar bracket can support structures, in addition to the fuel tank, which are bolted to the inclined bar bracket along the length of the inclined bar bracket.

6. The fuel tank mounting structure of claim 5, wherein a fuel pump is mounted on the inclined bar bracket.

7. The fuel tank mounting structure of claim 1, wherein the second plate surface of the inclined plate bracket is raised higher than the first plate surface of the inclined plate bracket.

8. The fuel tank mounting structure of claim 1, wherein the second plate surface of the inclined plate bracket and the each end of the inclined bar bracket are mounted on separate frame members having different relative heights.

9. A fuel tank mounting structure for mounting a substantially square column fuel tank under a floor of a vehicle, the fuel tank having a longitudinal front surface facing a front of the vehicle and extending transversely to a longitudinal direction of travel of the vehicle, a longitudinal rear surface facing a rear of the vehicle, a first width end and a second width end facing opposite sides of the vehicle; and two halves, divided along a diagonal plane, with each half having a flange circumscribing an edge which abuts the other half, the first and second width ends having abutting inclined flange portions; the fuel tank mounting structure comprising:

an inclined plate bracket having a first plate surface bolted to the inclined flange portions of the abutting halves of the first width end of the fuel tank and a second plate surface mounted onto a surface, receptive to the second plate surface, under the floor of the vehicle, the second plate surface being raised higher than the first plate surface; and a bar bracket extending in a diagonal direction parallel to the diagonal halves of the fuel tank and in abutting engagement with and bolted, along a length of the bar bracket, to the inclined flange portions of the abutting halves of the second width end of the fuel tank and mounted via opposite ends of the bar bracket onto frame members located under the floor of the vehicle, wherein the second plate surface of the inclined plate bracket and the each end of the bar bracket are mounted on separate frame members having different relative heights.

10. The fuel tank mounting structure of claim 9, wherein the flange on the front of the fuel tank extends a distance short of a vertical plane defined by the longitudinal front surface of the fuel tank.

11. The fuel tank mounting structure of claim 10, wherein the flange is chamfered.

12. The fuel tank mounting structure of claim 9, wherein the bar bracket can support structures, in addition to the fuel tank, which are bolted to the bar bracket along the length of the bar bracket.

13. The fuel tank mounting structure of claim 12, wherein a fuel pump is mounted on the bar bracket.

14. A fuel tank mounting structure for mounting a substantially square column fuel tank under a floor of an electric vehicle approximate a battery container box, the fuel tank having a longitudinal front surface facing a front of the vehicle and extending transversely to a longitudinal direction of travel of the vehicle, a longitudinal rear surface facing a rear of the vehicle, a first width end and a second width end facing opposite sides of the vehicle; and two halves, divided along a diagonal plane, with each half having a flange circumscribing an edge which abuts the other half, the first and second width ends having abutting inclined flange portions; the fuel tank mounting structure comprising:

an inclined plate bracket having a first plate surface bolted to the inclined flange portions of the abutting halves of the first width end of the fuel tank and a second plate surface mounted onto a surface, receptive to the second plate surface, under the floor of the vehicle; and an inclined bar bracket in abutting engagement with and bolted, along a length of the bar bracket, to the inclined flange portions of the abutting halves of the second width end of the fuel tank and mounted via one end of the bar bracket to the battery container box and the opposite end to the underside of the floor of the vehicle.

15. The fuel tank mounting structure of claim 14, wherein the flange on the front of the fuel tank is chamfered and extends a distance short of a vertical plane defined by the longitudinal front surface of the fuel tank.

16. The fuel tank mounting structure of claim 14, wherein the inclined bar bracket extends in a diagonal direction parallel to the diagonal halves of the fuel tank.

17. The fuel tank mounting structure of claim 14, wherein the second plate surface of the inclined plate bracket is raised higher than the first plate surface of the inclined plate bracket.

18. The fuel tank mounting structure of claim 14, wherein the second plate surface of the inclined plate bracket and the each end of the inclined bar bracket are mounted on separate frame members having different relative heights.

* * * * *